(12) United States Patent
Sublett

(10) Patent No.: US 10,643,136 B2
(45) Date of Patent: May 5, 2020

(54) SYSTEM FOR DERIVING DATA IN CONSTRAINED ENVIRONMENTS

(71) Applicant: Honeywell International Inc., Morristown, NJ (US)

(72) Inventor: John Sublett, Richmond, VA (US)

(73) Assignee: Honeywell International Inc., Morris Plains, NJ (US)

( * ) Notice: Subject to any disclaimer, the term of this patent is extended or adjusted under 35 U.S.C. 154(b) by 788 days.

(21) Appl. No.: 14/697,492

(22) Filed: Apr. 27, 2015

(65) Prior Publication Data

US 2016/0314395 A1 Oct. 27, 2016

(51) Int. Cl.
*G06N 5/02* (2006.01)

(52) U.S. Cl.
CPC .................... *G06N 5/025* (2013.01)

(58) Field of Classification Search
CPC ............ G06N 5/02; G06N 5/025; G06N 5/04
See application file for complete search history.

(56) References Cited

U.S. PATENT DOCUMENTS

| 8,515,736 B1 | 8/2013 | Duta |
| 8,595,245 B2 | 11/2013 | Cavestro et al. |
| 9,081,847 B2 | 7/2015 | Dos Santos et al. |
| 9,239,872 B2 | 1/2016 | Do Santos et al. |
| 2014/0375431 A1* | 12/2014 | Cristache .............. G01S 13/876 340/10.1 |

FOREIGN PATENT DOCUMENTS

WO  WO 2016050257 A1 *  4/2016  ....... G05B 19/41845

OTHER PUBLICATIONS

W. Zhang and K.M. Hansen, "An OWL/SWRL based diagnosis approach in a pervasive middleware", 20th Int'l Conf. on Software Eng. and Knowledge Eng., 2008, 6 pages. (Year: 2008).*

* cited by examiner

*Primary Examiner* — Vincent Gonzales

(57) ABSTRACT

A system and approach for deriving data for a constrained environment of a controller such as, for example, an embedded device. The controller may incorporate a processor and a memory connected to the processor. The memory may have a constrained capacity. The memory may contain an extensible set of rules for deriving additional semantic information from available information at the embedded device. The processor and the memory with the extensible set of rules may constitute a semantic rule engine. The semantic rule engine may apply the extensible set of rules to the available information to derive the additional semantic information.

17 Claims, 2 Drawing Sheets

SYSTEM FOR DERIVING DATA IN CONSTRAINED ENVIRONMENTS

BACKGROUND

The present disclosure pertains to devices with constrained environments and in particular to approaches to derive information in the environments.

SUMMARY

The disclosure reveals a system and approach for deriving data for a constrained environment of a controller such as, for example, an embedded device. The controller may incorporate a processor and a memory connected to the processor. The memory may have a constrained capacity. The memory may contain an extensible set of rules for deriving additional semantic information from available information at the embedded device. The processor and the memory with the extensible set of rules may constitute a semantic rule engine. The semantic rule engine may apply the extensible set of rules to the available information to derive the additional semantic information.

DESCRIPTION

Figure 1:
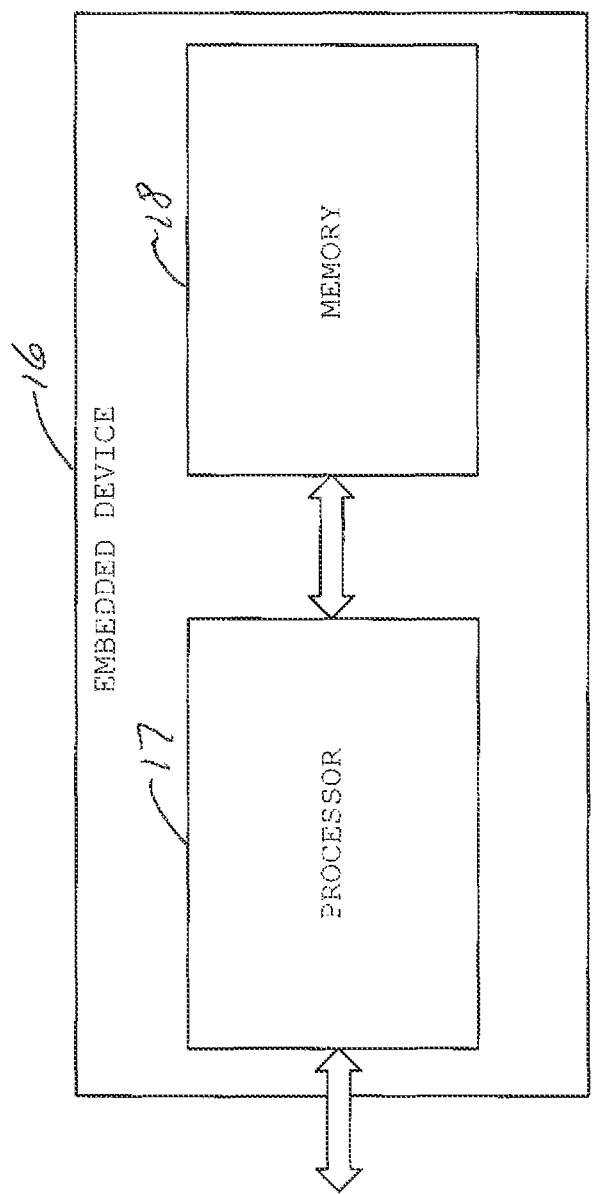
FIG. 1 is a diagram of an embedded device relating to the present system.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Embedded devices may typically have constrained system resources such as RAM and persistent storage. To achieve easier deployment for high value applications that use device data, systems should have much more semantic information available about devices, device data, and relationships between devices. Resource constraints in embedded devices may severely limit how much semantic information can be stored directly in the devices.

In many cases, information that already exists in the devices (e.g., names, identifications (ID's), programming, and configurations) may be used to derive other valuable semantic information that can be used for applications in the device itself or passed upward in another system for use in higher level applications. A feature of the present system and approach may be an extensible system of rules for deriving semantic information from other information. Rather than storing the semantic tags and relationships on each object, a set of rules may be used or evaluated on demand to determine the semantic data for each object. The rules may be based on name matching, containment, attributes, and relationships. The semantic rule engine may also allow new rules with new behaviors to be defined. The rules may be used to derive tags, attributes and relationships. This way, more information may be made available to devices such as derived information than what the memory could hold in terms of direct tags, relationships, and so on.

The present system and approach may be implemented in Niagara™ 4. By creating a typical application based on the Niagara 4 framework and adding one or more smart tag dictionaries to the application, additional tags and relationships may be present and accessible through Niagara API's and tools like search and hierarchy definitions, even though those tags and relationships do not necessarily actually exist in a persistent fashion in a data model. An API may be an application programming interface with routing, protocol and tools for building software applications.

To better enable analytics and other applications on device data, it may be beneficial to have an object model that represents the devices and incorporates meta-data about the devices including tags and relationships.

Metadata may describe other data, such as information about a certain item's content. For example, an image may include meta-data that describes how large the picture is, the color depth, the image resolution, when the image was created, and other data. A text document's metadata may contain information about how long the document is, who the author is, when the document was written, and a short summary of the document.

Tags may be marker tags which provide type information about the device (e.g., "Thermostat", "HVAC", "temperature") or value tags which provide property values (e.g., vendor="Honeywell"). A relationship may be a named association between two objects. Each tag or relationship that is defined directly on, in or by an object may consume some amount of the system memory. In a constrained embedded environment, the amount of memory required for the tags could limit the number of tags and relationships that can be used and therefore limit the value of the available meta-data to applications that need it.

The present system and approach may be a mechanism for associating tags and relationships with objects using rules rather than defining them directly on the object. Given a collection of objects defined in the system, an API may be created that allows the tags and relationships on those objects to be accessed. An implementation of the API may process a set of rules for an object to determine any derived tags or relationships, and to return a full set of tags and relationships for the object where the full set incorporates the tags and relationships defined directly on the object plus the tags and relationships derived from the rules.

A rule engine may contain a collection of rules to be used or evaluated against an object, on demand, when the tags or relationships for the object are accessed via the API. The set of rules evaluated by the rule engine may be extensible. Some examples of rules may incorporate: 1) Adding a tag or relationship based on pattern matching on the object name; 2) Adding a tag or relationship based on other tags defined directly on the object; and 3) Adding a tag or relationship based on a set of tags defined for virtually all objects in a collection.

FIG. 1 is a diagram of an embedded device 16 having a processor 17 and a memory 18 connected to processor 17.

Figure 2:
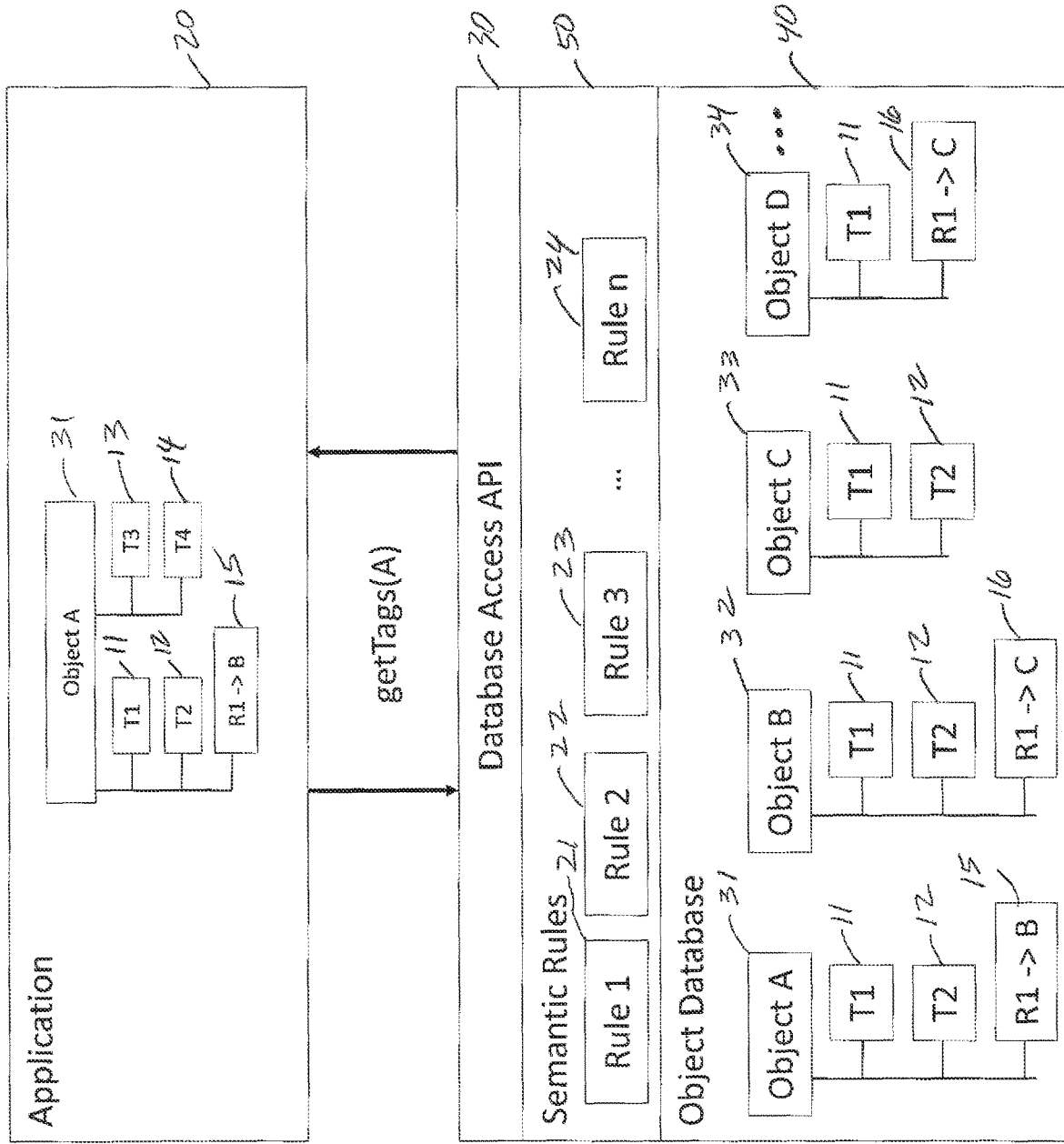
FIG. 2 is a diagram of a semantic layout of the present system and approach.

FIG. 2 is a diagram of a semantic layout of the present system and approach. An application 20 may select an object. For example, object (A) 31 and application 20 may get or receive tags (T1) 11 and (T2) 12 along with a relationship (R1→B) 15 from an object database 40. "(R1→B)" may mean that object (A) 31 has a relationship with an object (B) 32.

One or more other objects may be selected, such as object (B) 32 with tags (T1) 11 and (T2) 12 and a relationship (R1→C) 16, object (C) 33 with tags (T1) 11 and (T2) 12, object (D) 34 with tag (T1) 11 and relationship (R1→C) 16, and so forth. There may be semantic rules 50 such as rule (1) 21, rule (2) 22, rule (3) 23, and other rules up to rule (n) 24, where "n" may be a total number of rules. Tags (T3) 13 and (T4) 14 of object (A) 31 in application 20 may be derived. Relationships 15 and 16, and other possible relationships may be derived.

To recap, a mechanism for deriving data for a constrained environment, may incorporate an embedded device having a processor, and a memory connected to the processor. The memory may have a constrained capacity. The memory may contain an extensible set of rules for deriving additional semantic information from available information at the embedded device. The processor and the memory with the extensible set of rules may incorporate a semantic rule engine. The semantic rule engine may apply the extensible set of rules to the available information to derive the additional semantic information.

The memory may be between X percent of 100 percent full to Y percent of 100 percent full when holding the available information selected from a group incorporating an object database with objects having respective information incorporating tags, attributes and relationships, the extensible set of rules, an operating system, identifications, configurations, and a data programming interface for accessing the information in a useable format. X and Y may be numbers, and X=<Y.

The semantic rule engine may apply the extensible set of rules to the available information to derive the additional semantic information that can reduce available room of the memory from 100 percent full minus X percent, to 100 percent full minus Y percent.

The extensible set of rules may be based on one or more characteristics selected from a group incorporating name matching, containment, tags, attributes, and relationships.

The semantic rule engine may define new rules with new behaviors. The new rules may be used by the semantic rule engine to derive more additional semantic information. The more additional semantic rule information may be storable in the memory as long as the available room in the memory is less than 100 percent full.

An application programming interface, and search and hierarchy definition tools may access additional tags and relationships from information of a data model developed by the semantic rule engine.

An approach for deriving a semantic data model within a constrained environment, may incorporate connecting a microprocessor to a memory to form an embedded device. The memory may have a limited capacity for information. The memory may contain an extensible set of rules for deriving semantic information from a certain amount information in the memory. The extensible set of rules may be applied to the certain amount of information in the memory of the device to derive additional semantic information from the certain amount of information.

The processor and memory with the extensible set of rules may constitute a semantic rule engine.

The semantic rule engine may permit new rules with defined behaviors to be added to the set of extensible rules. The rules may be used to derive tags, attributes and relationships.

The approach may further incorporate accessing additional tags and relationships from information of a data model developed by the semantic rule engine, with an application programming interface, and search and hierarchy definition tools.

The extensible set of rules may be based on one or more characteristics selected from a group incorporating name matching, containment, attributes, and relationships.

One or more rules of the extensible set of rules may be selected from a group incorporating adding a tag or relationship based on pattern matching on an object name, adding a tag or relationship based on other tags defined directly on the object, and adding a tag or relationship based on a set of tags defined for virtually all objects in a collection.

A system for developing additional information from existing information within a constrained environment, may incorporate an embedded device having a processor, and a memory having a constrained capacity for a certain amount of semantic information. The memory may contain an extensible set of rules for deriving semantic information from the certain amount of information. The extensible set of rules may be applied by a semantic rule engine to the certain amount of information in the memory of the device to derive additional semantic information from the certain amount of information.

The semantic rule engine may incorporate components of the processor. The semantic rule engine may use the extensible set of rules to derive tags, attributes and relationships. The semantic rule engine may derive additional rules having new behaviors.

Components of the processor and portions of the memory may incorporate an application programming interface, and search and hierarchy definition tools that can derive additional tags and relationships from information of a data model developed by the semantic rule engine.

One or more rules of the extensible set of rules can be selected from a group incorporating adding a tag or relationship based on pattern matching on an object name, adding a tag or relationship based on other tags defined directly on the object, and adding a tag or relationship based on a set of tags defined for virtually all objects in a collection.

The extensible set of rules may be based on one or more characteristics selected from a group incorporating name matching, containment, attributes, and relationships.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A mechanism for deriving data for a constrained environment, comprising:
an embedded device comprising:
a processor; and
a memory connected to the processor; and
wherein:
the memory has a capacity and one or more of any of a tag, an attribute, and a relationship stored in the memory;

the memory contains an extensible set of rules for deriving one or more of any of an additional tag, attribute, and relationship related to the embedded device from the one or more tags, attributes, and relationships stored in the memory, the extensible set of rules and the one or more of a tag, an attribute, a relationship stored in the memory have a combined data size equal to or less than the capacity of the memory;

the processor and the memory with the extensible set of rules comprise a semantic rule engine;

on demand in response to a request from an application communicating with the embedded device, the processor applies the extensible set of rules of the semantic rule engine to the one or more tags, attributes, and relationships stored in the memory to return to the application a set of tags, attributes, and relationships related to the embedded device that includes the one or more tags, attributes, and relationships stored in the memory and one or more of any of an additional tag, attribute, and relationship related to the embedded device that are derived from the one or more tags, attributes, and relationships stored in the memory using the extensible set of rules;

the derived one or more additional tags, attributes, and relationships provide information about the embedded device that is not expressly indicated in the tags, attributes, and relationships stored in the memory; and the combined data size of the extensible set of rules and the one or more tags, attributes, and relationships stored in the memory added to a data size of the derived one or more additional tags, attributes, and relationships related to the embedded device totals an amount of data that is greater than the capacity of the memory.

2. The mechanism of claim 1, wherein the extensible set of rules is based on one or more characteristics selected from a group comprising name matching, containment, tags, attributes, and relationships.

3. The mechanism of claim 1, wherein the semantic rule engine can define new rules with new behaviors.

4. The mechanism of claim 3, wherein the new rules are used by the semantic rule engine to derive the one or more additional tags, attributes, and relationships related to the embedded device.

5. The mechanism of claim 4, wherein the one or more additional tags, attributes, and relationships are stored in the memory when the available room in the memory is less than 100 percent full.

6. The mechanism of claim 1, wherein an application programming interface and search and hierarchy definition tools access the set of tags, attributes, and relationships related to the embedded device in response to the request from the application.

7. A method for deriving a semantic data model within a constrained environment, comprising:
   connecting a microprocessor to a memory to form an embedded device; and
   wherein:
   the memory has a capacity and stores one or more of any of tags, attributes, and relationships related to the embedded device;
   the memory contains an extensible set of rules for deriving one or more of any of an additional tag, attribute, and relationship related to the embedded device from the one or more tags, attributes, and relationships stored in the memory, the one or more tags, attributes, and relationships stored in the memory and the extensible set of rules have a combined data size equal to or less than the capacity of the memory;
   on demand in response to a request from an application communicating with the embedded device, the processor applies the extensible set of rules to the one or more tags, attributes, and relationships stored in the memory of the device to return to the application a set of tags, attributes, and relationships related to the embedded device that includes the one or more tags, attributes, and relationships stored in the memory and one or more of any of an additional tag, attribute, and relationship related to the embedded device that are derived from the one or more tags, attributes and relationships stored in the memory using the extensible set of rules;
   the derived one or more additional tags, attributes, and relationships provide information about the embedded device that is not expressly indicated in the tags, attributes, and relationships stored in the memory; and
   the combined data size of extensible set of rules and the one or more tags, attributes, and relationships stored in the memory added to a data size of the derived one or more additional tags, attributes, and relationships related to the embedded device totals an amount of data that is greater than the capacity of the memory.

8. The method of claim 7, wherein the processor and memory with the extensible set of rules constitutes a semantic rule engine.

9. The method of claim 8, wherein the semantic rule engine permits new rules with defined behaviors to be added to the set of extensible rules.

10. The method of claim 8, further comprising accessing the set of tags, attributes, and relationships with an application programming interface, and search and hierarchy definition tools in response to the request from the application.

11. The method of claim 7, wherein the extensible set of rules is based on one or more characteristics selected from a group comprising name matching, containment, attributes, and relationships.

12. The method of claim 7, wherein one or more rules of the extensible set of rules can be selected from a group comprising adding a tag or relationship based on pattern matching on an object name, adding a tag or relationship based on other tags defined directly on the object, and adding a tag or relationship based on a set of tags defined for virtually all objects in a collection.

13. A system for developing additional information from existing information within a constrained environment, comprising:
   an embedded device comprising:
      a processor; and
      a memory having a capacity and tags, attributes, and relationships related to the embedded device stored therein; and
   wherein:
   the memory contains an extensible set of rules configured to derive one or more tags, attributes, and relationships related to the embedded device from the stored tags, attributes, and relationships related to the embedded device;
   the extensible set of rules and the tags, attributes, and relationships stored in the memory have a combined data size equal to or less than the capacity of the memory;
   on demand in response to a request from an application computing with the embedded device, the processor applies the extensible set of rules to the tags, attributes, and relationships stored in the memory of the embedded device to return to the application a set of tags, attributes, and relationships related to the embedded device that includes the one or more tags, attributes, and relationships stored in the memory and one or more of any of an additional tag, attribute, and relationship related to the embedded device that are derived from the one or more tags, attributes, and relationships stored in the memory using the extensible set of rules;

the derived one or more additional tags, attributes, and relationships provide information about the embedded device that is not expressly indicated in the tags, attributes, and relationships stored in the memory; and the combined data size of the extensible set of rules and the one or more tags, attributes, and relationships stored in the memory and a data size of the derived one or more additional tags, attributes, and relationships related to the embedded device totals an amount of data that is greater than the capacity of the memory.

14. The system of claim 13, wherein the semantic rule engine can derive additional rules having new behaviors.

15. The system of claim 13, wherein the processor and portions of the memory comprise an application programming interface, and search and hierarchy definition tools that accesses the set of one or more tags, attributes, and relationships in response to the request from the application.

16. The system of claim 13, wherein one or more rules of the extensible set of rules can be selected from a group comprising adding a tag or relationship based on pattern matching on an object name, adding a tag or relationship based on other tags defined directly on the object, and adding a tag or relationship based on a set of tags defined for virtually all objects in a collection.

17. The system of claim 13, wherein the extensible set of rules is based on one or more characteristics selected from a group comprising name matching, containment, attributes, and relationships.

* * * * *